(12) United States Patent
Natarajan

(10) Patent No.: US 8,670,563 B2
(45) Date of Patent: Mar. 11, 2014

(54) SYSTEM AND METHOD FOR DESIGNING SECURE CLIENT-SERVER COMMUNICATION PROTOCOLS BASED ON CERTIFICATELESS PUBLIC KEY INFRASTRUCTURE

(75) Inventor: Vijayarangan Natarajan, Chennai (IN)

(73) Assignee: Tata Consultancy Services Ltd. (IN)

( * ) Notice: Subject to any disclaimer, the term of this patent is extended or adjusted under 35 U.S.C. 154(b) by 235 days.

(21) Appl. No.: 12/963,409

(22) Filed: Dec. 8, 2010

(65) Prior Publication Data
US 2012/0023336 A1    Jan. 26, 2012

(30) Foreign Application Priority Data
Dec. 10, 2009    (IN) .......................... 2849/MUM/2009

(51) Int. Cl.
*H04L 9/00*      (2006.01)
*H04L 9/32*      (2006.01)

(52) U.S. Cl.
USPC ............. 380/44; 380/277; 713/168; 713/169; 713/171

(58) Field of Classification Search
USPC ........ 380/28, 30, 44, 285; 713/168, 171, 179, 713/180
See application file for complete search history.

(56) References Cited

U.S. PATENT DOCUMENTS

| | | | |
|---|---|---|---|
| 6,169,803 B1 * | 1/2001 | Sako et al. ...................... 380/44 |
| 6,477,254 B1 | 11/2002 | Miyazaki et al. |
| 7,123,721 B2 * | 10/2006 | Panjwani et al. ............. 380/270 |
| 7,549,044 B2 | 6/2009 | Lee et al. |
| 7,664,259 B2 * | 2/2010 | Frosik et al. ..................... 380/30 |
| 7,673,141 B2 | 3/2010 | Kilian-Kehr et al. |
| 7,680,260 B2 * | 3/2010 | Abramson et al. ........ 379/211.02 |
| 7,961,873 B2 * | 6/2011 | Ibrahim .......................... 380/28 |
| 8,074,265 B2 * | 12/2011 | Relyea ............................. 726/9 |
| 2007/0033403 A1 * | 2/2007 | Lauter et al. .................. 713/171 |
| 2007/0043946 A1 * | 2/2007 | Lauter et al. .................. 713/171 |
| 2008/0069338 A1 | 3/2008 | Relyea |
| 2009/0003597 A1 | 1/2009 | Gantman et al. |
| 2010/0153728 A1 * | 6/2010 | Brown .......................... 713/171 |
| 2010/0211779 A1 * | 8/2010 | Sundaram ..................... 713/168 |
| 2010/0306525 A1 * | 12/2010 | Ferguson ...................... 713/151 |
| 2011/0055567 A1 * | 3/2011 | Sundaram et al. ............ 713/169 |

FOREIGN PATENT DOCUMENTS

CN              1444168          9/2003

OTHER PUBLICATIONS

Gupta, V., Gupta, S., Chang, S., Stebila, D., "Performance analysis of elliptic curve cryptography for SSL", WiSE '02 Proceedings of the 1st ACM workshop on Wireless security, 2002 pp. 87-94 [retrieved on Jun. 17, 2012 on ACM database].*

(Continued)

*Primary Examiner* — Tae Kim
(74) *Attorney, Agent, or Firm* — Robert Plotkin, P.C.

(57) ABSTRACT

A system and method for facilitating secure client server communication using elliptical curve cryptography and certificateless public key infrastructure has been disclosed. The system includes a secret key generation means which generates a secret key of m-bits based on the elliptic curve diffie hellman algorithm. The system further includes a session key generation means which makes use of said secret key and elliptic curve diffie hellman algorithm to generate a session key. The session key is used to facilitate secured communication between the client and the server.

14 Claims, 3 Drawing Sheets

(56) References Cited

OTHER PUBLICATIONS

Gura, N., Shantaz, C., Hans, E., Gupta, S., Gupta, V., Finchelstein, D., Goupy, E., Stebila, D., "An End-to-End Systems Approach to Elliptic Curve Cryptography", Cryptographic Hardware and Embedded Systems—CHES 2002 Lecture Notes in Computer Science, 2003, vol. 2523/2003 [retrieved on Jun. 17, 2012 from SpringerLink database].*

Yongliang, L., Gao, W., Yao, H., Yu, X., "Elliptic Curve Cryptography Based Wireless Authentication Protocol", national Journal of Network Security, vol. 5, No. 3, pp. 327-337, Nov. 2007 [retrieved on Jun. 17, 2012 from Internet "http://ijns.femto.com.tw/contents/ijns-v5-n3/ijns-2007-v5-n3-p327-337.pdf"].*

* cited by examiner

SYSTEM AND METHOD FOR DESIGNING SECURE CLIENT-SERVER COMMUNICATION PROTOCOLS BASED ON CERTIFICATELESS PUBLIC KEY INFRASTRUCTURE

CROSS-REFERENCE TO RELATED APPLICATIONS

This application claims priority from Indian Patent Application No. 2849/MUM/2009, filed on Dec. 10, 2009, entitled, "A system and method for designing secure client-server communication protocols based on certificateless public key infrastructure."

FIELD OF THE INVENTION

This invention relates to the field of communication.
Particularly, this invention relates to the field of cryptography and network security.

DEFINITIONS OF TERMS USED IN THE SPECIFICATION

The term 'Primitives' in this specification relates to known systems used for creating and verifying digital signatures such as elliptic curve diffie hellman system, elliptic curve digital signature system, and also to known systems that are used to randomize the message as well as verify the authenticity of the message, such as message randomization system, jacobi identity verification system and the like.

The term 'Digital Signature' or 'Signature' in this specification relates to a mechanism for determining the authenticity of a message, financial transaction and cases where there is a necessity to detect forgery or tampering.

These definitions are in addition to those expressed in the art.

BACKGROUND OF INVENTION AND PRIOR ART

Client-server networking is a distributed application architecture that partitions tasks or work loads between service providers (servers) and service requesters (clients). This kind of network communication is not necessarily secure. In order to have a secure communication in the client-server set up, many researchers and organizations incorporate methods such as public key based cryptography, identity based cryptography and the like.

A strong password-based Authentication Key Exchange (PAKE) was patented by Bollovin and Merritte in 1993. It is an interactive method for two or more parties to establish cryptographic keys based on one or more party's knowledge of a password. Later, Stanford University patented Secure Remote Protocol (SRP) that was used for a new password authentication and key-exchange mechanism over an untrusted network. Then, Sun Microsystems came up with an implementation of the Elliptic Curve Cryptography (ECC) technology which was well integrated into the Open SSL-Certificate Authority. This code enabled secure TLS/SSL handshakes using the Elliptic curve based cipher suites.

Other works done in this field:

U.S. Pat. No. 6,477,254 granted to Seiji Miyazaki and Kazuo Takaragi provides a data encryption and decryption method which includes an encryption step and a decryption step. In the encryption step, there are prepared n pairs of secret keys and public keys in a public-key cryptographic scheme, where n is a positive integer. A new key is generated in accordance with at least one of the public keys. Data is encrypted in a common-key cryptographic scheme by use of the new key. There is prepared a (k, n) threshold logic (k is an integer equal to or less than n) having terms associated with the new key and the n public keys. A calculation of the threshold logic is conducted by use of the new key and the n public keys, and encrypted data and a result of the calculation of the threshold logic are stored. In the decryption step, the new key is restored from k secret keys selected from the n secret keys and the stored result of the threshold logic calculation in accordance with a threshold reverse logic corresponding to the threshold logic and stored data is decrypted by the restored key in the common-key cryptographic scheme. The focus of the U.S. Pat. No. 6,477,254 is on providing a data encryption and decryption method that includes the steps of data encryption and data decryption respectively. The data encryption step further includes 'n' pairs of secret keys and public keys and generating a new key using at least two of the generated public keys.

U.S. Pat. No. 7,673,141 granted to Roger Kilian-Kehr et al provides a system for providing secured access to an application service. The system envisaged by the U.S. Pat. No. 7,673,141 includes a challenge provider that uses a first cryptographic technique to provide a challenge to a client seeking access to an application service. The client uses a second cryptographic technique to generate a response, and provides the response to an authentication service. The authentication service grants the client access to the application service only if the challenge and response are authenticated using a first authentication technique complementary to the first cryptographic technique and a second authentication technique complementary to the second cryptographic technique, respectively.

United States Patent Application 2008069338 filed by Robert Relyea provides a computer system and a method for verifying a location factor associated with the token (client). The token receives an encrypted challenge from a server. The encrypted challenge is encrypted by a key commonly shared by the server and the token. The token then decrypts the encrypted challenge by the commonly shared key and manipulates the challenge by a predetermined elliptic curve cryptography (ECC) procedure to obtain a manipulated challenge. The token returns a signed manipulated challenge and an ECC public key to the server as a reply to the challenge. The server receives the signed manipulated challenge and verifies that the signed manipulated challenge was actually generated at the token based upon the ECC public key. In case of the US Patent Application No. 2008069338 the client receives an encrypted challenge from the server, the challenge is encrypted using a key that is known to both the client and the server (public key).

United States Patent Application 2009003597 filed by Alexander Gantman et al provides a method and apparatus with means for use in authentication between two entities having agreed on the use of a common modulus N. The method envisaged by US Patent Application No. 2009003597 comprises the steps of, generating a pseudorandom string value from an input value; generating a first public key value based on the modulus N and the pseudorandom string value; generating a first private key value corresponding to the first public key value; receiving a second public key value; and generating a shared secret value based on the modulus N, the first private key value and the second public key value; determining the authentication signature using the shared secret value and transmitting the said authentication signature. The system envisaged by the US Patent Application No.

2009003597 makes use of the key generation unit to generate the first public key and the first private key. The system further makes use of a receiver unit to receive a second public key value and a secret key generation unit to generate a secret shared key value.

United States Patent Application 2010211779 filed by Ganapathy S. Sundaram provides a key agreement protocol between a first party and a second party. According to the US Patent Application No. 2010211779, a random key component is generated, encrypted by the first party (server) and sent to the second party (client). The random key part is encrypted using the public key of the second party. Accordingly the second party receives the random key component sent from the first party, and in addition to receiving the first random key component the second party generates the second key component. At the client end (at the second party), the first key component and the second key component are encrypted to form a random encrypted key component pair. So generated random key component pair is encrypted and transmitted from the second party (client) to the first party (server). Upon receiving the encrypted random key component pair from the second party, the server or the first party sends an encrypted second random key component to the second party and the key to be used in all the subsequent communication between the client and the server are computed and decided at the first party (server) based on the second random key component. The focus of the US Patent Application No. 2010211779 is on providing an identity based encryption scheme.

U.S. Pat. No. 7,549,044 granted to Lane W. Lee provides a block-level storage device which has been configured to implement a digital rights management (DRM) system. In response to receiving a public key from an associated host system, the storage device challenges the host system to prove it has the corresponding private key to establish trust. This trust is established by encrypting a secure session key using the public key. The host system uses its private key to recover the secure session key. The storage device may store content that has been encrypted according to a content key. In addition, the storage device may encrypt the content key using the secure session key. The focus of the U.S. Pat. No. 7,549,044 is on providing a digital rights management system. In case of the system envisaged by the U.S. Pat. No. 7,549,044 the secure session key itself is encrypted and subsequently decrypted in order to ensure a secured communication between the storage device and the client.

Chinese Patent Application 1444168 filed by Zhu Huafei discloses creating an elliptic curve public key certificate based on the probability of asymmetric encryption method. The system envisaged by the Chinese Patent Application No. 1444168 further includes making use of the principles of anti-collision hash functions, public key encryption system and public key certificate scheme in order to facilitate secured communication between the client and the server. The present invention is dissimilar from the system envisaged by the Chinese Patent Application No. 1444168 in that it provides certificateless public key infrastructure. Even though the Chinese Patent Application discloses making use of elliptic curve cryptography (ECC), the major dissimilarity lies in the fact that the present invention makes use of certificateless public key infrastructure whereas the Chinese Patent Application discloses using a certificate based public key infrastructure.

The disadvantages associated with the systems proposed by the prior art and related art patent documents are that all of the above approaches are implemented on certificate-based public key cryptography and the identity-based cryptography techniques. These cryptography methods face costly and complex key management problems and the key escrow problem in the real-life deployment. Recently, the certificateless public key cryptography (CL-PKC) was introduced to address these problems, which have not been solved fully. Typically, CL-PKC uses bilinear pairings and inverse operations which would slowdown the performance of the system.

Hence, there was felt a need for a cost and time effective system which is based on certificateless public key cryptosystem but does not make use of the principle of bilinear pairing.

OBJECTS OF THE INVENTION

It is an object of the present invention to provide a system for securing communication between a client and a server;

It is another object of the present invention to provide a robust system for securing communication between a client and a server;

It is yet another object of the present invention to provide a system which is tamper-proof;

It is still another object of the present invention to provide a lightweight authentication system;

It is still another object of the present invention to provide a cost effective system which uses certificateless public key cryptography techniques;

It is still another object of the present invention to provide a time efficient system which implements certificateless public key cryptography techniques without bilinear pairing;

It is still another object of the present invention to provide a system that is capable of functioning under lower bandwidths;

It is still another object of the present invention to provide a space efficient system which requires lesser amount of storage space for its operations;

It is still another object of the present invention to provide a system that provides an instant and secure way of performing online cash transactions;

It is still another object of the present invention to provide a system that prevents the occurrence of replay and rushing attacks;

It is still another object of the present invention to provide a system that helps reduce information loss; and It is still another object of the present invention to provide a system whose performance will not be compromised even during transmission of large amount of data.

SUMMARY OF THE INVENTION

In accordance with the present invention there is provided a system for facilitating secure client server communication, said system comprising:

a random number generator adapted to generate a random number;

processing means adapted to receive said random number and produce a processed value;

first verification means adapted to receive and verify said processed value to detect forgery, said first verification means further adapted to generate a verified value;

computing means coupled to first verification means, said computing means adapted to generate a first value, said computing means further adapted to generate a second value corresponding to said first value;

second verification means having predetermined primitives, said second verification means adapted to receive and verify said second value, said second verification means further adapted to generate a public key and corresponding private key;

secret key generation means having said predetermined primitives, said secret key generation means adapted to receive said public key from said second verification means and generate a secret key; and session key generation means having said predetermined primitives, said session key generation means adapted to receive said secret key from said secret key generation means and generate a session key;

said secret key and said session key facilitating secure client server communication.

Typically, in accordance with this invention, the processing means includes an encryption means adapted to receive said random number and encrypt said random number with the public key using elliptic curve encryption.

Typically, in accordance with this invention, the processing means includes a preprocessing means adapted to receive said random number and process said random number using message randomization.

Typically, in accordance with this invention, the first verification means includes a decryption means adapted to receive said processed value and decrypt said processed value with the private key using elliptic curve encryption.

Typically, in accordance with this invention, the first verification means includes a preprocessing means adapted to receive and verify said processed value using message randomization to detect forgery.

Typically, in accordance with this invention, the first value is selected form the group consisting of pair of public key and private key and Jacobi identity.

Typically, in accordance with this invention, the second value is selected from the group consisting of digitally signed value and lie product.

Typically, in accordance with this invention, the predetermined primitives are selected from the group consisting of curve diffie hellman method, elliptic curve digital signature method and jacobi identity verification system.

Typically, in accordance with this invention, the predetermined primitives are selected from the group consisting of elliptic curve diffie hellman system and elliptic curve digital signature system.

In accordance with the present invention there is provided a method for facilitating secure client server communication, said method comprising the steps of:

generating a random number;
processing said random number to generate a processed value;
verifying said processed value to detect forgery;
generating a first value;
generating a second value corresponding to said first value;
verifying said second value using predetermined primitives;
generating a public key and a corresponding private key;
transmitting said public key and retaining said private key;
receiving transmitted public key and generating a secret key based on predetermined primitives; and
generating a session key based on said secret key and said predetermined primitives.

Typically, in accordance with this invention, the method of processing said random number to produce a processed value further includes the step of encrypting said random number with the public key using elliptic curve encryption system.

Typically, in accordance with this invention, the method of processing said random number to produce a processed value further includes the step of processing said random number using primitives selected from the group consisting of bit shuffling, compression, T-function and linear feedback shift registration.

Typically, in accordance with this invention, the method of verifying said processed value further includes the step of decrypting said processed value with the private key using elliptic curve encryption method.

Typically, in accordance with this invention, the method of verifying said processed value further includes the step of verifying said processed value by using message randomization method.

Typically, in accordance with this invention, the method of generating said first value further includes the step of generating a pair of public key and private key;

Typically, in accordance with this invention, the method of generating said first value further includes the step of generating the jacobi identity.

Typically, in accordance with this invention, the method of generating said second value based on said first value further includes the step of generating a digitally signed value.

Typically, in accordance with this invention, the method of generating said second value based on said first value further includes the step of generating a lie product.

Typically, in accordance with this invention, the step of verifying said second value using predetermined primitives, further includes the step of verifying said second value using predetermined primitives selected from the group consisting of curve diffie hellman method, elliptic curve digital signature method and jacobi identity verification method.

Typically in accordance with this invention, the step of receiving transmitted public key and generating a secret key based on predetermined primitives further includes the step of generating said secret key based on predetermined primitives selected from the group consisting of elliptic curve diffie hellman method and elliptic curve digital signature method.

Typically in accordance with this invention, the step of generating a session key based on said secret key and said predetermined primitives further includes the step of generating a session key using said session key and predetermined primitives selected from the group consisting of elliptic curve diffie hellman method and elliptic curve digital signature method.

BRIEF DESCRIPTION OF THE ACCOMPANYING DRAWINGS

The invention will now be described with reference to the accompanying drawings, in which.

DETAILED DESCRIPTION

The invention will now be described with reference to the embodiments shown in the accompanying drawings. The embodiments do not limit the scope and ambit of the invention. The description relates purely to the exemplary preferred embodiments of the invention and its suggested application.

According to this invention, there is envisaged a system and a set of three network security protocols to provide secure communication between client and server using certificateless public key Infrastructure (PKI).

The system includes at least one server which performs the function of generating keys that is a pair of public key and the private key, allowing the server to act as a Key Generation Center (KGC) and at least one client, forming server client architecture and the required infrastructure of the PKI which includes set of hardware, policies, procedures, and the like needed for communication.

The certificateless PKI based communication using first network security protocol initially allows server to act as a Key Generation Center (KGC) for distributing public and private keys to clients. The steps involved in setting up certificateless PKI based communications using first network security protocol are seen in FIG. 1.

Figure 1:
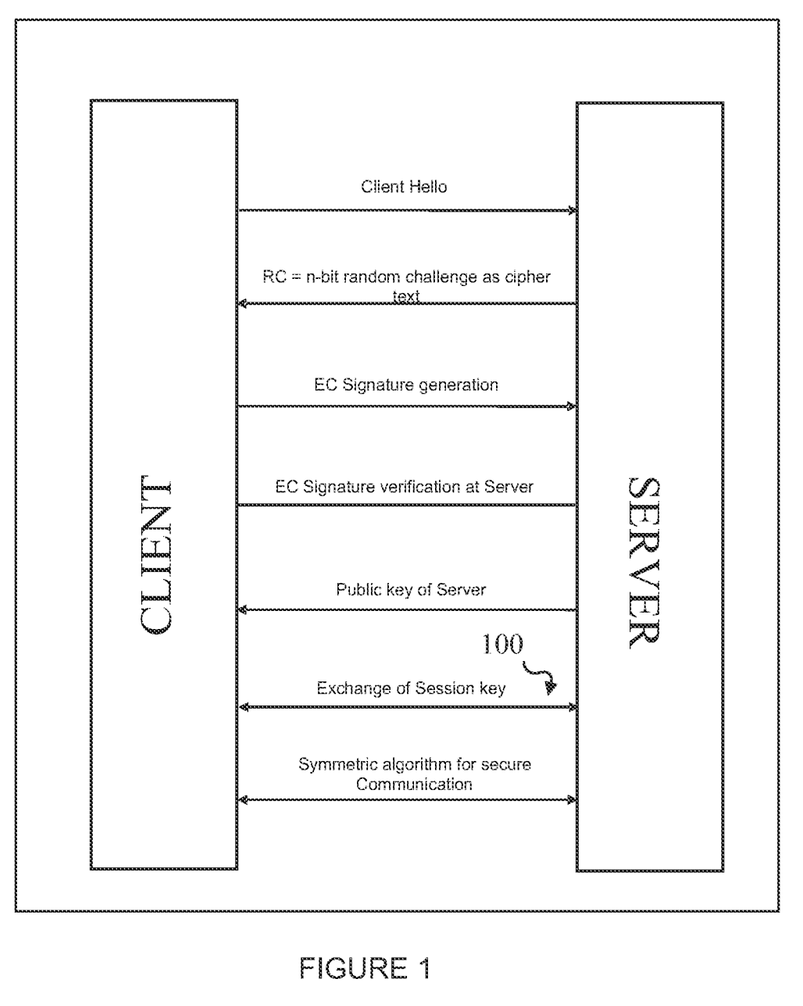
FIG. 1 illustrates a sequence diagram for the first network security protocol, in accordance with the present invention.

As shown in FIG. 1, the client initiates the communication by sending an introductory message such as "client Hello". In return to client message, the server generates a random number (value) of length 'n' bits using a random number generator. The server further encrypts the generated value using client's public key. No digital certificates are created during the process of encryption of random value. The server keeps track of the set of private key and public key assigned to individual clients. Elliptic curve encryption method is utilized at the server side for encrypting the value. The value that has been encrypted using client's public key is sent to the client. The server challenges the client to decrypt the value that contains the number in encrypted form, and prove its identity. The client receives the encrypted value and decrypts the encrypted value using its private key. The client decrypts the encrypted value using its private key and elliptic curve diffie hellman algorithm and verifies whether the value was sent form a trusted source. By successfully decrypting the encrypted value and recovering the original value the client proves to the server that it is trustworthy. The client, on completing the step of verification (i.e., decryption of the encrypted value sent by the server) of value sent by the server, generates a pair of public key and private key by making use of elliptic curve cryptography.

The client creates a signature on the decrypted value using elliptic curve digital signature algorithm and sends the signature to the server, the server on its part receives the signature sent by the client and verifies the signature using elliptic curve digital signature algorithm. Soon after verifying the signature sent by the client, the server generates a pair of public key and private key using elliptic curve diffie hellman algorithm and sends the generated public key to the client.

Upon receiving the public key from the server, the client generates a secret key of length 'm' bits using elliptic curve diffie hellman algorithm and shares the secret key with the server. The server in return generates an 'm' bit session key based on elliptic curve diffie hellman algorithm. The secret key and the corresponding session key are generated using elliptic curve diffie hellman algorithm. Reference numeral 100 of FIG. 1 denotes the step of generation of session key of length 'm' bits using elliptic curve diffie hellman algorithm. For all the subsequent communications and transactions between the server and the client, the session key is used. Since the session key is known only to the server and the client, the communication between the client and the server is entirely secure.

The steps involved in the method for facilitating a secure communication between the server and the client using first network security protocol are given below.

Initial set up: Every client has a pair of Public and Private keys generated by the server which acts as a Key Generation Center (KGC).

First Step: Client initiates the communication to server by sending a message 'Client Hello!'

Second Step: Server generates Random challenge or Random value of n-bits using Pseudo Random Number Generator (PRNG). Further, Server encrypts Random value with client's public key using Elliptic Curve Encryption method (ECE). Client decrypts the encrypted random value with its private key using ECE.

Third Step: Client generates Public and Private Keys on Elliptic curve by making use of elliptic curve cryptography method. The length of the public key and the private key could either be 256 bits or 384 bits or 512 bits as recommended by NIST (National Institute of Standards and Technology). Client creates a signature on the value sent by the server using elliptic curve digital signature algorithm and sends the signature to Server.

Fourth Step: Server verifies the signature using elliptic curve digital signature algorithm and subsequently generates a key pair on the elliptic curve. Server sends its public key to Client.

Fifth Step: Client and server negotiate an m-bit shared secret key using ECDH (elliptic curve diffie hellman) algorithm.

Sixth Step: Client and server negotiate Session key of m bits generated using elliptic curve diffie hellman algorithm, for the purpose of Encryption. Client and server have a cipher suite.

Seventh Step: A secure communication is established between Client and Server.

In the above protocol, an attacker cannot guess a random challenge or random value generated in the protocol, as it is transmitted in an encrypted form and hence the replay and rushing attacks are prevented.

Figure 2:
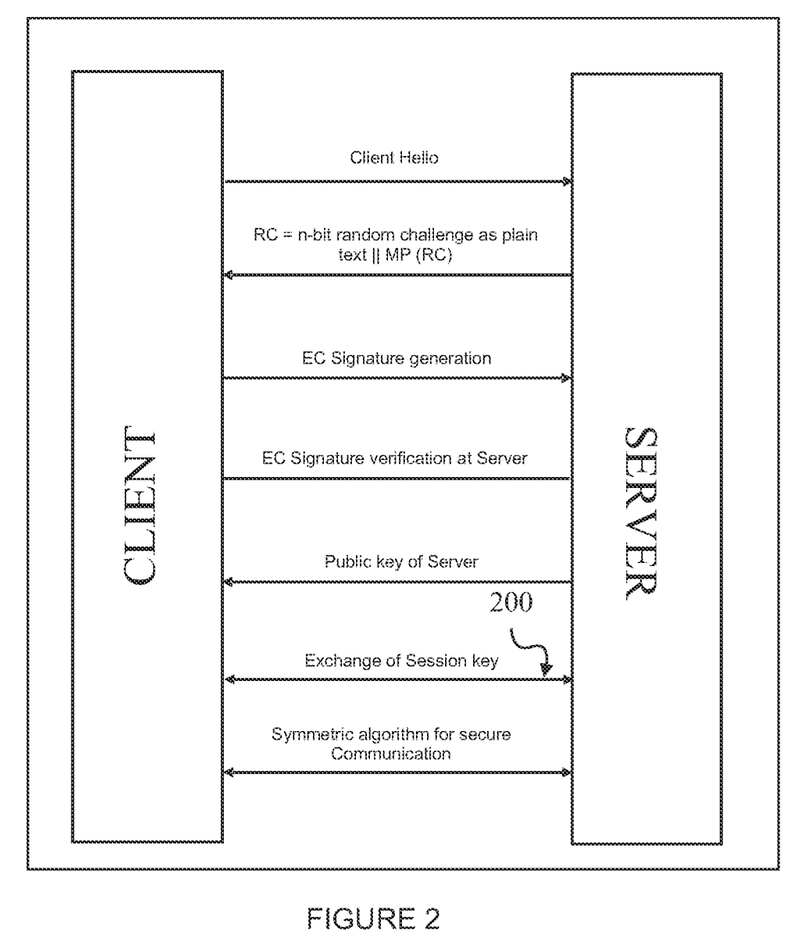
FIG. 2 illustrates a sequence diagram for the second network security protocol, in accordance with the present invention.

The steps involved in setting up certificateless PKI based communications using second network security protocol are seen in FIG. 2. The certificateless PKI based communication using second network security protocol is slightly different from first Network security protocol as there is no initial set up for generating a pair of public and private keys for client and server but client and server have a unique message pre-processing (MP) function which converts the plain text into a random message. Bijective mapping is used for the purpose of ensuring that no modification has taken place, when the random value is sent. In case of the random value, the bit sequence representing the particular value will be altered or randomized thereby masking the original value.

As shown in FIG. 2, the client initiates the communication by sending an introductory message such as "client Hello". In return to client message, the server generates a random number (value) of length 'n' bits using a random number generator. The server processes the generated random value using the message preprocessing function (message randomization function). The message preprocessing function includes performing three operations in sequential manner. The three operations are shuffling, T-Function and LFSR (Linear Feedback Shift Register). The process of preprocessing starts with shuffling of bits. Shuffling of bits helps increase the diffusion. Diffusion refers to the property that, the redundancy in the statistics of the input is dissipated in the output. The process of shuffling is invertible and the original bit sequence can be easily recovered from the shuffled bit sequence.

The process of bit shuffling is followed by the process of T-Function. T-function is an update function which updates every bit by a linear combination of the same bit and the less significant bits. The process of T-function is followed by the function of LFSR (Linear Feedback Shift Register). LFSR is a process that includes using an irreducible polynomial of degree 32 and period $2^{32}-1$. In case of LFSR the given input is shifted with the given polynomial for 4 to 15 cycles. The output of bit shuffling, T-Function and LFSR (collectively referred to as preprocessing) is a highly randomized value.

The server after subjecting the generated value to the preprocessing function sends the preprocessed value and the original value to the client. The preprocessed value is a derivative of the original value and the only difference between the preprocessed value and the original value is that, in case of the preprocessed value the bit sequence would be altered. At the client end, the preprocessed value is verified using the functions of shuffling, T-Function and LFSR in the reverse order, i.e., the process of LFSR is followed by T function and bit shuffling. The order of conduction of the above mentioned process is reversed in case of preprocessing the value. Since all the three functions are invertible, the order of conduction can be reversed without any data loss and adverse effects. The client after performing the above mentioned functions in the reverse order (i.e., LFSR followed by T-Functioning and Bit shuffling) obtains the verified value. Client compares the verified value that has been obtained as a result of performing the process of LFSR, T-Functioning and bit shuffling and the original value sent by the server thereby detecting whether the value had been forged. After verifying the value sent by the server, if the value sent by the server is authentic, the client generates a pair of public key and private key using the elliptic curve diffie-hellman algorithm. The client further creates a signature on the value sent by the server using elliptic curve digital signature algorithm and sends the signature along with its public key to the server. The server on receiving the signature, verifies the signature sent by the client using elliptic curve digital signature algorithm and subsequently generates a pair of public key and private key using elliptic curve diffie hellman algorithm. Subsequently, the server sends the generated public key to the client.

Upon receiving the public key from the server, the client generates a secret key of length 'm' bits using elliptic curve diffie hellman algorithm and shares the secret key with the server. The server in return generates an 'm' bit session key based on the secret key and elliptic curve diffie hellman algorithm. The secret key and the corresponding session key are generated by making use of elliptic curve diffie hellman algorithm. Reference numeral 200 of FIG. 2 denotes the step of generation of session key of length 'm' bits based on the secret key and elliptic curve diffie hellman algorithm. For all the subsequent communications and transactions between the server and the client, the session key is used. Since the session key is known only to the server and the client, the communication between the client and the server is entirely secure.

The steps involved in the method for facilitating a secure communication between the server and the client using the second network security protocol are given below.

First Step: Client initiates the communication to server by sending a message 'Client Hello!'

Second Step: Server generates Random challenge or Random Number of n-bits using Pseudo Random Number Generator (PRNG) and computes the message preprocessing of Random Number. Client receives the Random Number and MP (Random Number). It verifies MP (Random Number).

Third Step: Client generates Public and Private keys on Elliptic curve. The length of the private key and the public key could be either 256 bits or 384 bits or 512 bits as recommended by NIST (National Institute of Standards and Technology). Client signs the value sent by the server using elliptic curve digital signature algorithm and sends the signature with its public key to Server.

Fourth Step: Server verifies the signature and generates a key pair on the elliptic curve. Server sends its public key to Client.

Fifth Step: Client and Server negotiate an m-bit shared secret key using ECDH (elliptic curve diffie hellman) algorithm.

Sixth Step: Client and Server negotiate a Session key of m bits created using elliptic curve diffie hellman algorithm, for the purpose of Encryption. Client and Server have a cipher suite.

Seventh Step: A secure communication is established between Client and Server.

In the above protocol, replay and rushing attacks are prevented as Random Number is sent in plain with MP (Random Number) and it is interesting to see the notion of bijective property in MP, that an attacker can change the Random Number, but MP (Random Number) cannot be changed.

The certificateless PKI (Public Key Infrastructure) based communication using third network security protocol is similar to first Network Security Protocol but the difference can be seen in signature generation. Client uses Jacobi identity, a special product on Lie algebras, to authenticate server. The Jacobi identity works on a random challenge $RC=x\|y\|z$ and follows the relationship $[[x, y], z]+[[y, z], x]+[[z, x], y]=0$.

Figure 3:
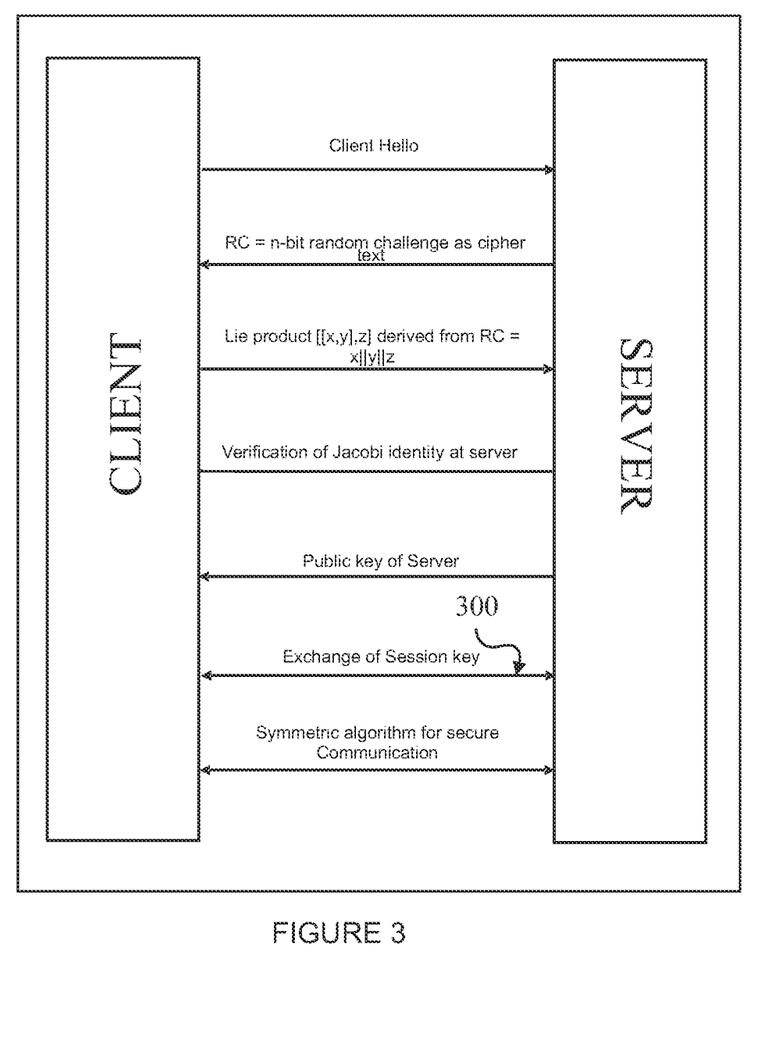
FIG. 3 illustrates a sequence diagram for the third network security protocol, in accordance with the present invention.

The steps involved in setting up certificateless PKI based communications using third network security protocol are seen in FIG. 3.

As shown in FIG. 3, the client initiates the communication by sending an introductory message such as "client Hello". In return to client message, the server generates a random number (value) of length 'n' bits using a random number generator. The server further encrypts the generated value using client's public key. No digital certificates are created during the process of encryption of random value. The server keeps track of the set of private key and public key assigned to individual clients. Elliptic curve cryptography method is utilized at the server side for encrypting the value. The value that has been encrypted using client's public key is sent to the client. The server challenges the client to decrypt the encrypted value and prove its identity. The client receives the encrypted value and decrypts the encrypted value using its private key and elliptic curve cryptography method thereby proving to the server that it is a trusted destination.

The client further computes the jacobi identity on the sent value. That is, the client divides the decrypted value into three parts. The client further generates the lie product on the received value.

In accordance with the invention, if the value is divided into three parts namely x, y and z then the jacobi identity of the value would be represented by $x\|y\|z$. The jacobi identity of the random number is verified by using the relationship $[[x, y], z]+[[y, z], x]+[[z, x],y]=0$.

In accordance with the invention, when the client generates and sends the lie product of the value to the server, the server verifies the lie product sent by the client using the relationship $[[x, y], z]+[[y, z], x]+[[z, x],x]=0$. After verifying the authenticity of the lie product sent by the client, the server further generates a pair of public key and private key by making use of elliptic curve cryptography. Elliptic curve diffie hellman algorithm which forms a part of the elliptic curve cryptography is used for the purpose of generating the pair of public key and private key. The client subsequently sends its public key to the client. Upon receiving the public key from the server, the client generates a secret key of length 'm' bits using elliptic curve diffie hellman algorithm and shares the secret key with the server. The server in return generates an 'm' bit session key using the secret key and elliptic curve diffie hellman algorithm. The secret key and the corresponding session key are generated by making use of elliptic curve diffie hellman algorithm. Reference numeral 300 of FIG. 3 denotes the step of generation of session key of length 'm' bits. For all the subsequent communications and transactions between the server and the client the session key is used. Since the session key is known only to the server and the client, the communication between the client and the server is entirely secure.

The steps involved in the method for facilitating a secure communication between the server and the client using the third network security protocol are given below.

Initial set up: Every client has a pair of Public and Private keys generated by the server which acts as a Key Generation Center (KGC).

First Step: Client initiates the communication to server by sending a message 'Client Hello!'

Second Step: Server generates Random challenge or Random Number of n-bits using Pseudo Random Number Generator (PRNG). Further, Server encrypts Random Number with client's public key using Elliptic Curve Cryptography method (ECC). Client decrypts the encrypted Random number with its private key using Elliptic Curve Cryptography method.

Third Step: Client computes Jacobi identity on Random Number=x∥y∥z and sends the Lie product [[x, y], z] to server.

Fourth Step: Server verifies the relationship [[x, y], z]+[[y, z], x]+[[z, x], y]=0. Server sends its public key using ECC (elliptic curve cryptography) to Client.

Fifth Step: Client and server negotiate an m-bit shared secret key using ECDH (elliptic curve diffie hellman) algorithm.

Sixth Step: Client and server negotiate a Session key of m bits that has been generated using elliptic curve diffie hellman algorithm, for the purpose of Encryption. Client and server have a cipher suite.

Seventh Step: A secure communication is established between Client and Server.

TECHNICAL ADVANCEMENTS

The technical advancements of the present invention are as follows:

The present invention provides a robust system for secured communication between a client and a server.

Present invention provides a system which is tamper-proof

Present invention provides a lightweight authentication system.

Present invention provides a cost effective system which uses certificateless public key cryptography techniques.

Present invention provides a time efficient system which implements certificateless public key cryptography techniques without bilinear pairing.

Present invention provides a set of protocols using which, the replay and rushing attacks could be prevented.

Present invention provides a set of protocols which could be operated even with lower bandwidths.

Present invention provides a set of protocols that reduce the probability of loss of information by employing analytically strong functions.

Present invention provides a set of protocols that would allow the users to carry out secure online cash transactions.

Present invention provides a set of protocols whose performance will not be adversely affected due to the presence of larger amounts of transferable data.

The present invention is useful in applications in client-server set up over TLS (Transport Security Layer) and UDP (User Datagram Protocol) communications, smart phones, mobile banking, location based systems, set-top box units, access control systems, remote control systems, personal digital assistants, wireless devices, alarm systems, mesh topology networks, mobile payment system, key less go systems, mobile communications and the like.

While considerable emphasis has been placed herein on the particular features of this invention, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. A system for facilitating secure client server communication, said system comprising:
    a random number generator to generate a random number;
    a processor to receive said random number and produce a processed value;
    a first verifier to receive and verify said processed value to detect forgery, said first verifier further to generate a verified value;
    a computer coupled to said first verifier, said computer to generate a first value, said computer further to generate a second value corresponding to said first value;
    a second verifier having predetermined primitives, said second verifier to receive and verify said second value, said second verifier further to generate a public key and corresponding private key;
    a secret key generator having said predetermined primitives, said secret key generator to receive said public key from said second verifier and generate a secret key based on said predetermined primitives; and
    a session key generator having said predetermined primitives, said session key generator to receive said secret key from said secret key generator and generate a session key based on said predetermined primitives, the session key corresponding to said secret key;
    said secret key and said session key facilitating secure client server communication,
    wherein said secret key and said session key are both generated based on the same predetermined primitives, and
    wherein said predetermined primitives are selected from the group consisting of elliptic curve Diffie Hellman system, elliptic curve digital signature system, message randomization system and Jacobi identity verification system.

2. The system as claimed in claim 1, wherein said processor includes an encryptor to receive said random number and encrypt said random number with the public key using elliptic curve encryption.

3. The system as claimed in claim 1, wherein said processor includes a preprocessing processor to receive said random number and preprocess said random number to produce said processed value.

4. The system as claimed in claim 1, wherein said first verifier includes a decryptor to receive said processed value and decrypt said processed value with the private key using elliptic curve encryption.

5. The system as claimed in claim 1, wherein said first verifier includes a preprocessing processor to receive and verify said processed value to detect forgery.

6. The system as claimed in claim 1, wherein said first value is selected from the group consisting of jacobi identity and pair of public key and private key.

7. The system as claimed in claim 1, wherein said second value is selected from the group consisting of digitally signed value and lie product.

8. A method for facilitating secure client server communication, said method comprising the steps of:
- using a random number generator to generate a random number;
- using a processor to process said random number to generate a processed value;
- using a first verifier to receive and verify said processed value to detect forgery;
- using a computer to generate a first value;
- using the computer to generate a second value corresponding to said first value;
- using a second verifier to verify said second value using predetermined primitives;
- using the second verifier to generate a public key and a corresponding private key;
- using the second verifier to transmit said public key and to retain said private key;
- using a secret key generator to receive said transmitted public key and to generate a secret key based on predetermined primitives; and
- using a session key generator to generate a session key based on said secret key and said predetermined primitives,
- wherein the secret key and the session key are generated based on the same predetermined primitives, and
- wherein said predetermined primitives are selected from the group consisting of elliptic curve Diffie Hellman system, elliptic curve digital signature system, message randomization system and Jacobi identity verification system.

9. The method as claimed in claim 8, wherein the step of processing said random number to generate a processed value further includes processing said random number using primitives selected from the group consisting of elliptic curve Diffie Hellman method, elliptic curve digital signature method and message randomization method.

10. The method as claimed in claim 8, wherein the step of verifying said processed value to detect forgery further includes verifying said processed value using primitives selected from the group consisting of elliptic curve Diffie Hellman method, elliptic curve digital signature method and message randomization method.

11. The method as claimed in claim 8, wherein the step of generating said first value further includes generating a value selected from the group consisting of pair of public key and private key and Jacobi identity.

12. The method as claimed in claim 8, wherein the step of generating said second value corresponding to said first value further includes generating a value selected from the group consisting of digitally signed value and lie product.

13. The method as claimed in claim 8, wherein the step of generating a secret key further includes generating said secret key based on primitives selected from the group consisting of elliptic curve Diffie Hellman method and elliptic curve digital signature method.

14. The method as claimed in claim 8, wherein the step of generating a session key based on said secret key and predetermined primitives further includes generating said session key based on primitives selected from the group consisting of elliptic curve Diffie Hellman method and elliptic curve digital signature method.

* * * * *